Jan. 24, 1950 W. M. DAY ET AL 2,495,230
CONTAINER WITH CAPILLARY CONTROLLED DISPENSING MEANS
Filed Dec. 6, 1944 2 Sheets-Sheet 1
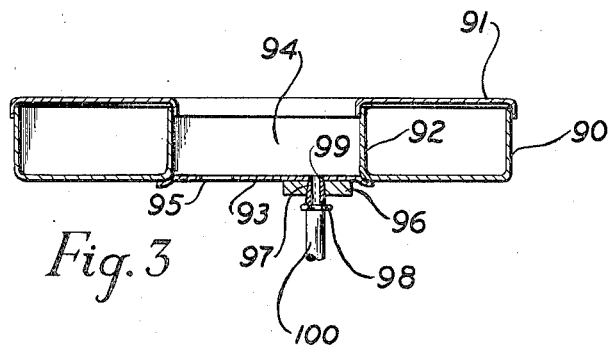
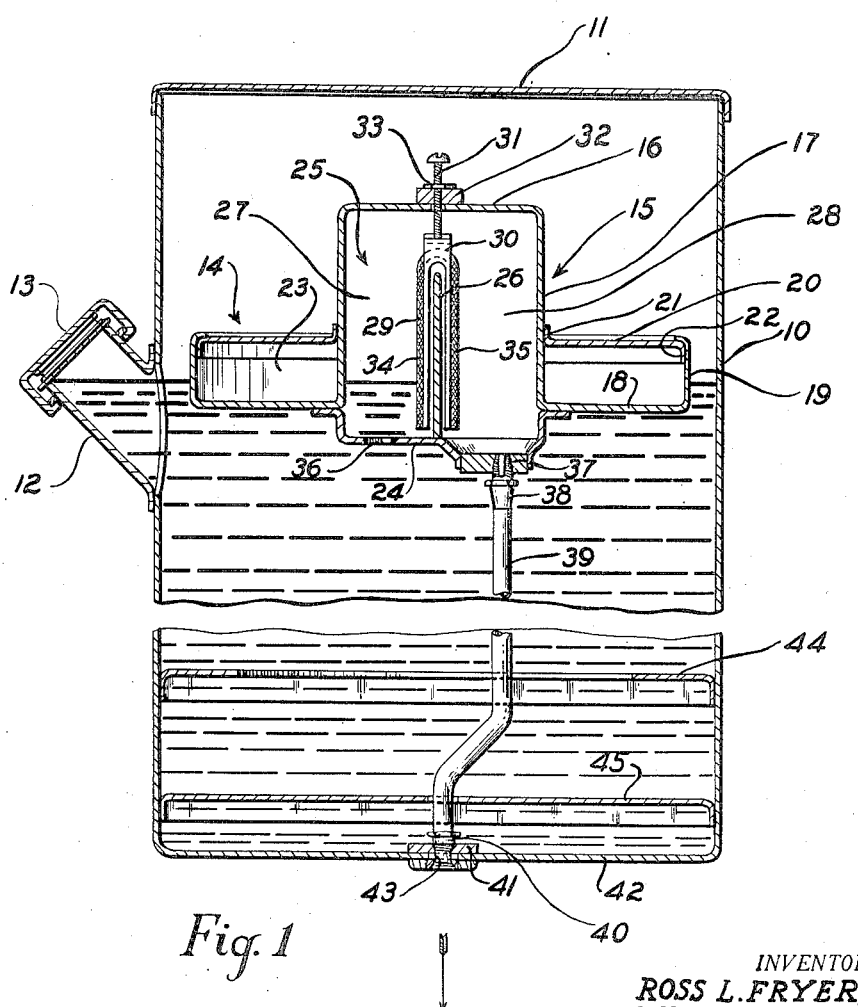
INVENTORS.
ROSS L. FRYER, JR.
BY WILLIAM M. DAY
ATTORNEYS Patented Jan. 24, 1950

2,495,230

UNITED STATES PATENT OFFICE 2,495,230

CONTAINER WITH CAPILLARY CONTROLLED DISPENSING MEANS

William M. Day, Salisbury, Md., and Ross L. Fryer, Jr., Washington, D. C.

Application December 6, 1944, Serial No. 566,936

8 Claims. (Cl. 222—187)

(Granted under the act of March 3, 1883, as amended April 30, 1928; 370 O. G. 757)

The invention described herein may be manufactured and used by or for the Government for governmental purposes without the payment to us of any royalty thereon.

This invention relates generally to containers, and particularly to containers adapted to meter and deliver predetermined quantities of fluid.

Although it is a primary object of the present invention to provide a container for delivering small quantities of liquid fuel to heaters, the invention may also be used to meter other types of fluid and for other uses.

Two devices are in common use in connection with liquid fuel burning heaters of the gravity feed type for the purpose of metering the fuel to the heater at a predetermined rate. One controls a fixed head of fuel on a predetermined orifice size to secure the desired rate of flow, and the other controls a fixed head of fluid on a wick which meters the fuel by capillary action from one side of a dam to the other. With each of these metering devices the fixed head of fuel is maintained at a constant level by means of a conventional type float mechanism, consisting of a float chamber, a float and a needle valve mechanism. With this construction, the needle valve is closed at a desired point by means of the float rising in the chamber. Trouble is frequently experienced with float mechanisms of this type in that they may stick either in open or closed position, causing the burner either to flood or to go out.

It is, therefore, an object of this invention to eliminate the forementioned disadvantages by providing a device for measuring and delivering a specific and accurate quantity of fluid, and which eliminates the necessity for a float controlled valve.

Another object of the invention is to provide a metering device combined with a fluid container as a single unit.

A further object is to provide a container in which a constant predetermined head of fluid is maintained on a metering device or orifice by making the metering device or orifice an integral part of the float mechanism.

Still another object is to provide a metering device which may be remotely positioned with respect to the heater, thus removing the ordinary float chamber and valve from the immediate vicinity of the heater and eliminating the fire hazard occasioned by sizable quantities of fuel being located in the region of the heater and the heat and flame therein.

It is also an object of the invention to provide a metering device in which the quantity of fluid delivered may be readily adjusted.

Other objects of the invention will be made more apparent as this description proceeds, particularly when considered in connection with the accompanying drawings, in which:

Figure 1 is a vertical cross-sectional view through a metering container embodying the present invention;

Figure 3 is a fragmentary cross-sectional view similar to a portion of Figure 1, but illustrating another modification.

Figure 2:
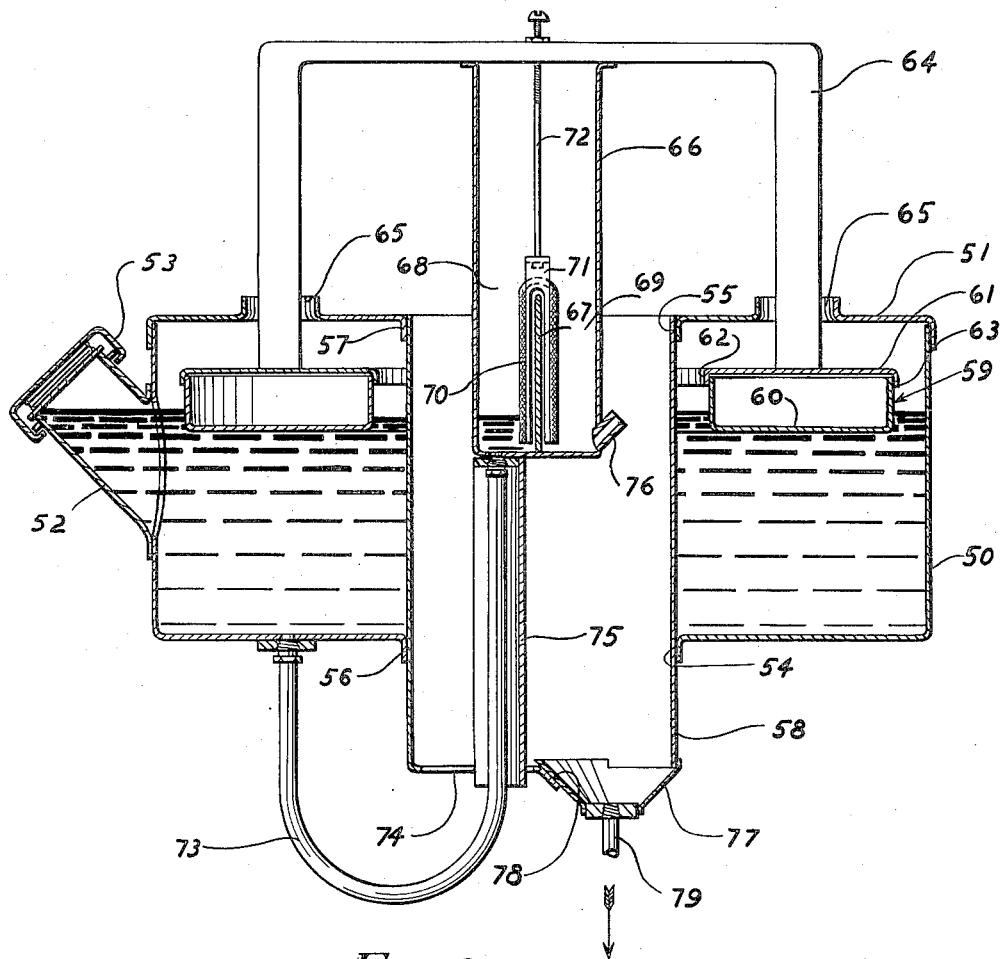
Figure 2 is a vertical cross-sectional view of a modification thereof.

Referring now to the drawings, and particularly to Figure 1, the reference character 10 indicates a fuel container or tank having a cover 11 and a filler spout 12, the latter being provided with a filler cap 13. The spout 12 is positioned a predetermined distance below the top of the tank to prevent the tank from being filled above that level, for a purpose which will appear later.

Positioned within the tank 10 is a float 14, having an overall width somewhat smaller than the width of the tank 10, to prevent sticking or binding during movement of the float within the tank. In the present instance both the tank and the float are cylindrical in cross section although tanks and floats of other designs may be used as well.

The body of the float 14 comprises a metal stamping 15 having a top 16, a cylindrical axially extending body 17, a radially extending web 18, and an annular wall 19 extending axially upwardly from the outer periphery of the web 18. The float 14 is provided with a cover 20 comprising a flat plate having a central aperture for receiving the body 17 of the float and provided with an annular flange 21 adapted to be suitably secured thereto. An annular flange 22 is provided at the outer periphery of the cover 20 and is adapted to fit inside the annular wall 19 of the float. The flange 22 is suitably secured to the wall 19, and the upper portion of the wall 19 is bent inwardly to assist in retaining the cover 20 in place.

It will be noted that the body 17, web 18, wall 19 and the cover 20 cooperate to form an annular closed float chamber 23. The float chamber 23 is of a size to provide the necessary buoyancy.

Suitably secured, as by welding, to the web 18 is a dished member 24, which cooperates with the cylindrical body 17 and the top 16 to form a wick chamber 25. Extending upwardly from the center of the dished member 24, substantially centrally of the wick chamber 25, is a baffle or dam 26 dividing the wick chamber 25 into an inlet chamber 27 and an outlet chamber 28.

A capillary wick 29, mounted upon a yoke 30, is suspended from the top wall 16 of the float by means of an adjustable screw 31 threaded in a reinforcing block 32 mounted upon the top wall. It will thus be noted that the capillary wick 29 may be raised or lowered in the wick chamber 25 by means of adjusting the screw 31. A lock nut 33 is provided to lock the screw 31 in its adjusted position.

The wick 29 is U-shaped and has one end 34 extending into the inlet chamber 27 and an opposite end 35 extending into the outlet chamber 28. The dished member 24 is apertured at 36 to provide an inlet establishing communication between the fuel in the tank 10 and the interior of inlet chamber 27. This construction is effective to maintain a constant head of fuel in the chamber 27 at all times. Because of its fixed buoyancy, the float 15 is always submerged a uniform amount into the fuel contained in the tank 10. Fuel admitted to the chamber 27 through the inlet 36 therefore rises to a predetermined level, which is constant at all times regardless of the amount of fuel in the tank 10.

In this connection it will be noted that the position of the filler spout 12 prevents the tank 10 from being filled with fuel above a certain level. This is necessary to maintain a constant head of fuel in the chamber 27 since if the tank 10 were filled to such a height that the top of the float 14 struck the cover 11 of the tank, fuel would rise in the chamber 27 and increase the head. This would render the device inoperative to meter the fuel at a given rate, since the rate of metering is dependent upon the head and a constant head must be maintained in order to maintain a constant rate of flow through the metering device.

The fuel in the chamber 27 is carried over the dam 26 by means of the capillary action of the wick 29, being metered in the process and being transferred at a predetermined rate depending upon the amount of submersion of the end 34 of the wick within the fuel in the chamber 27. The lower portion of the outlet chamber 28, formed by the dished member 24, is generally conical in shape to funnel the fuel delivered by the capillary wick 29 into an outlet opening 37 in the bottom thereof. A fitting 38 is threaded into the outlet opening 37 and has connected thereto a flexible tube 39, the opposite end of which is connected by means of a fitting 40 to a reinforcement 41 secured to the bottom wall 42 of the tank 10. The reinforcing block 41 has a passage 43 extending therethrough adapted to be connected by means of tubing (not shown) to a heater (not shown).

The length of the flexible tube 39 is sufficient to permit the float 14 to rise to the maximum level of the fuel permitted by the position of the filler spout 12, and being flexible permits the float to descend in the tank 10 as the fuel is used by the heater and the fuel level in the tank decreases.

In order to prevent the bottom of the float 14 and the fitting 38 from striking the bottom of the tank 10, there is provided an annular stop 44 suitably secured to the side wall of the tank at a predetermined distance above the bottom wall 42 thereof. The annular stop 44 extends inwardly from the wall of the tank sufficiently to provide a ledge upon which the web 18 of the float will rest in its lower-most position.

Intermediate the annular stop 44 and the bottom wall 42 of the tank is a plate 45 forming a winding deck for the flexible tube 39. The purpose of the plate 45 is to prevent the flexible tube from becoming kinked and from lying upon the bottom of the tank, in which position the portion of the tube immediately adjacent the fitting 40 might form a bend which would obstruct the free flow of fuel therethrough.

The construction described above provides a metering device combined with a fuel tank to form a single unit. With this arrangement there is no sizable quantity of fuel in the immediate vicinity of the burner, thus removing a fire hazard present in the conventional construction. Since the float mechanism does not operate a needle valve as in the present devices now in use, the probability of the device becoming inoperative due to clogging or sticking is greatly reduced.

By making the metering device an integral part of the float mechanism, and placing the combined unit in the fuel tank, there is provided a constant predetermined head of fuel on the metering device, thus insuring a flow of fuel to the heater at the desired rate.

Figure 2 illustrates a modification of the invention particularly designed to achieve two advantages, namely, to prevent fuel from draining into the heater in the event the flexible tube develops a leak, and to prevent the possibility of the flexible tube becoming kinked and causing an erratic flow of fuel to the heater. This modification includes a fuel container or tank 50, a cover 51 for the tank, a filled spout 52, and a filler cap. The tank 50 and the cover 51 are centrally apertured at 54 and 55 respectively and are provided with flanges 56 and 57 adjacent the apertures to support a cylindrical shell 58, positioned therein and secured thereto by any suitable means.

Within the tank 50 and encircling the shell 58 is a float 59, comprising an annular channel shaped stamping 60 forming the body of the float, and an annular cover 61 having internal and external peripheral flanges 62 and 63 fitting over the edges of the stamping 60 and suitably secured thereto. The float 59 floats upon the fuel in the tank 50 and has sufficient buoyancy to support the metering mechanism hereinafter described. As in the construction shown in Figure 1, the filler spout 52 is spaced from the top of the tank a distance sufficient to limit the amount of fuel in the tank and prevent the float from striking the top thereof.

A yoke 64 extends upwardly from opposite sides of the cover 61 of the float and passes through enlarged openings 65 in the cover 51 of the tank. Depending from the upper portion of the yoke 64 is a cylindrical container 66 positioned substantially concentric with and extending into the cylindrical shell 58 of the tank 50.

The lower portion of the container 66 is divided by means of a baffle or dam 67 into an inlet chamber 68 and outlet chamber 69. Straddling the dam 67 is a capillary wick 70, supported upon a yoke 71. The wick is adjustably mounted upon the yoke 64 by means of the screw member 72. The container 66 and the capillary wick 70 are thus mounted for movement as a unit with the float 59.

A flexible tube 73 interconnects the bottom of the inlet chamber 68 with the bottom of the fuel tank 50 and establishes communication therebetween. As in the previous construction there is maintained a constant head of fuel in the inlet chamber 68 regardless of variations in the amount of fuel in the tank 50.

The bottom of the cylindrical shell 58 of the fuel tank is provided with an opening 74 to permit the flexible tube 73 to extend therethrough. There is also provided a shield 75 secured to the lower portion of the container 66 and providing a guard and guide for the flexible tube.

The capillary wick 70 may be adjusted by means of the screw 72 to provide the desired rate of flow of the fuel from the inlet chamber 68 to the outlet chamber 69. The fuel in the outlet chamber 69 is discharged through the spout 76 and falls by gravity into a funnel shaped member 77 mounted in an opening 78 provided in the bottom of the cylindrical shell 58. From the funnel shaped member 77 the metered fuel passes through the tube 79 to the heater (not shown).

Should a leak or rupture occur in the flexible tube 73, the fuel in the tank 50 will leak out but will not be discharged into the heater. This constitutes a safety factor in that the discharge of a large quantity of fuel into the heater might cause an explosion or a serious fire. A further advantage of the modified construction is that the flexible tube 73 is suspended by gravity from the bottom of the tank 50 and the container 66 and also is guided by means of the shield 75. Accordingly, the possibility of it becoming kinked is greatly reduced. Furthermore the necessity for a flexible tube between the outlet chamber 69 and the outlet tube 79 to the heater is eliminated with this construction.

Figure 3 illustrates another modification of the invention in which an orifice is used for metering the fuel rather than a capillary wick as shown in Figures 1 and 2. This arrangement may be advantageously used with either the general construction shown in Figure 1 or that shown in Figure 2. The modified float comprises an annular body 90 channel shaped in cross section and provided with a cover 91. The cylindrical inner wall 92 of the body 90 of the float cooperates with a bottom plate 93 to form a liquid chamber 94. The bottom plate 93 is provided with an inlet opening 95 adapted to admit fluid from the fuel tank into the liquid chamber 94. A reinforcing block 96 is secured to the bottom of the plate 93 and is formed with a threaded opening 97 therein for the insertion of a fitting 98, the latter being provided with a restricted orifice 99. The fitting 98 extends through an opening in the bottom plate 93 and thus establishes communication between the liquid chamber 94 and the outlet tube 100, the latter leading to a heater (not shown). The restricted orifice 99 functions with the fixed head of fuel maintained in the chamber 94 to provide a rate of flow of fuel at a predetermined rate to the heater.

Although we have shown and described certain embodiments of the invention, it will be understood that we do not wish to be limited to the exact construction shown and described, but that various changes and modifications may be made without departing from the spirit and scope of our invention as defined in the appended claims.

What we claim is:

1. A device of the character described comprising a fluid container, a float within said container, a fluid chamber carried by said float, said chamber having an inlet therein communicating with said container to admit fluid into said chamber, means providing a fluid outlet for said chamber, means for separating fluid in said chamber about said inlet from said outlet, a metering device for delivering the fluid in said chamber to said outlet at a predetermined rate, means providing an outlet in said container near the bottom thereof, and a flexible conduit establishing communication between the outlet for said chamber and the outlet in said container.

2. A device of the character described comprising a fluid container, a float within said container, a fluid chamber carried by said float, said chamber having an inlet therein communicating with said container to admit fluid into said chamber, means providing a fluid outlet for said chamber, means for separating fluid in said chamber about said inlet from said outlet, a metering device for delivering the fluid in said chamber to said outlet at a predetermined rate, means providing an outlet in said container near the bottom thereof, a flexible conduit establishing communication between the outlet for said chamber and the outlet in said container, and means in said container for limiting the downward movement of said float.

3. A device of the character described comprising a fluid container, a float within said container, a fluid chamber carried by said float, said chamber having an inlet therein, a flexible duct establishing communication between said inlet and said container, means providing a fluid outlet, means for separating fluid in said chamber about said inlet from said outlet, and a metering device associated with said chamber for delivering fluid to said outlet at a predetermined rate.

4. A device of the character described comprising a fluid container, a float within said container, a fluid chamber carried by said float, said chamber having an inlet therein, a flexible duct establishing communication between said inlet and said container, means providing a fluid outlet for said chamber, means for separating fluid in said chamber about said inlet from said outlet, a metering device associated with said chamber for delivering fluid to said outlet at a predetermined rate, and means carried by said container for receiving fluid from said outlet.

5. The combination with a float disposed on a body of liquid, of a liquid chamber carried by the float and comprising side and bottom walls, the bottom wall of the liquid chamber being disposed lower than the surface of the body of liquid, a partition separating the liquid chamber into an inlet chamber and a discharge chamber, means for conducting liquid from the body of liquid into the inlet chamber, and a capillary wick extending from within the liquid in the inlet chamber into the outlet chamber.

6. The combination with a float disposed on a body of liquid, of an inlet chamber carried by the float and comprising side and bottom walls, the bottom wall of the chamber being disposed lower than the surface of the body of liquid, means for conducting liquid from said body of liquid through the bottom wall into the inlet chamber, a discharge chamber, and a capillary wick extending from within the liquid in said inlet chamber into said discharge chamber.

7. The combination with a float disposed on a body of liquid, of an inlet chamber carried by the float and comprising side and bottom walls, the bottom wall of the chamber being disposed lower than the surface of the body of liquid, means disposed externally of the body of liquid for conducting liquid therefrom to the inlet chamber, a discharge chamber, and a capillary wick extending from within the liquid in the inlet chamber into the discharge chamber.

8. A device of the character described comprising a liquid container, an enclosed float chamber within said container, a liquid chamber comprising side and bottom walls carried by said float chamber, said side wall being integral with a wall of said float chamber, said bottom wall being integrally secured at the edge thereof to said float chamber adjacent a bottom portion thereof, a liquid inlet in said bottom wall of said liquid chamber for the admission of liquid from said container, a liquid outlet also in said bottom wall of said liquid chamber for the flow of liquid therefrom and spaced from said liquid inlet, adjustable metering means near said liquid outlet in said liquid chamber for adjustably limiting the flow of liquid from said liquid outlet to a predetermined rate, and a flexible conduit extending through the liquid space of said container and establishing communication between said liquid outlet and the exterior of said container.

WILLIAM M. DAY.
ROSS L. FRYER, Jr.

REFERENCES CITED

The following references are of record in the file of this patent:

UNITED STATES PATENTS

| Number | Name | Date |
|---|---|---|
| 311,225 | Born | Jan. 27, 1885 |
| 418,984 | Parks | Jan. 7, 1890 |
| 561,718 | Martindale | June 9, 1896 |
| 822,019 | Rose | May 29, 1906 |
| 882,030 | Traulson | Mar. 17, 1908 |
| 992,229 | Mille | May 16, 1911 |
| 1,181,783 | Lyons | May 2, 1916 |
| 1,743,894 | Johnson | Jan. 14, 1930 |
| 2,010,363 | Hine | Aug. 6, 1935 |

FOREIGN PATENTS

| Number | Country | Date |
|---|---|---|
| 377,940 | France | July 25, 1907 |